United States Patent

Whaite et al.

[11] Patent Number: 5,938,297
[45] Date of Patent: Aug. 17, 1999

[54] METHOD AND DEVICE FOR BRAKE APPLICATION

[75] Inventors: John Payson Whaite, Davison; Prakash Krishnamurthi Kulkarni, Novi; Bryan Todd Fulmer, Lindon, all of Mich.; Craig Alan Osterday, Dayton; Donald Lee Parker, Middletown, both of Ohio; Vivek Jaikamal, Ann Arbor, Mich.

[73] Assignee: General Motors Corporation, Detroit, Mich.

[21] Appl. No.: 08/764,947

[22] Filed: Dec. 13, 1996

[51] Int. Cl.⁶ .................................................. B60T 8/44
[52] U.S. Cl. .................................. 303/114.3; 303/113.3; 303/115.2
[58] Field of Search .............................. 303/114.3, 115.1, 303/115.2, 113.1, 113.2, 113.3, 115.4, 11, 12; 601/548, 547.1

[56] References Cited

U.S. PATENT DOCUMENTS

| | | | |
|---|---|---|---|
| 3,935,709 | 2/1976 | Mathues et al. | 60/547 |
| 4,024,713 | 5/1977 | Ueda | 60/547 |
| 4,107,926 | 8/1978 | Adachi | 60/548 |
| 4,110,985 | 9/1978 | Gordon et al. | 60/548 |
| 4,678,243 | 7/1987 | Leiber . | |
| 5,362,140 | 11/1994 | Burgdorf | 303/113.2 |

FOREIGN PATENT DOCUMENTS 2 252 373   5/1992   United Kingdom .

*Primary Examiner*—Peter M. Poon
*Attorney, Agent, or Firm*—Jeffrey A. Sedlar; Robert M. Sigler

[57] ABSTRACT

A method and device for brake application provides braking pressure augmentation when preferred. A power booster and master cylinder generate a braking pressure in relation to an operator's input on the brake pedal. An optional brake parameter sensor is used to determine when the power booster reaches a run-out condition. At least one control valve and pump are used to apply braking pressure in response to additional increases in brake pedal application by the operator, after the power booster reaches a run-out condition. The pump and control valve are optionally used to generate braking pressure independent of brake pedal inputs.

3 Claims, 3 Drawing Sheets

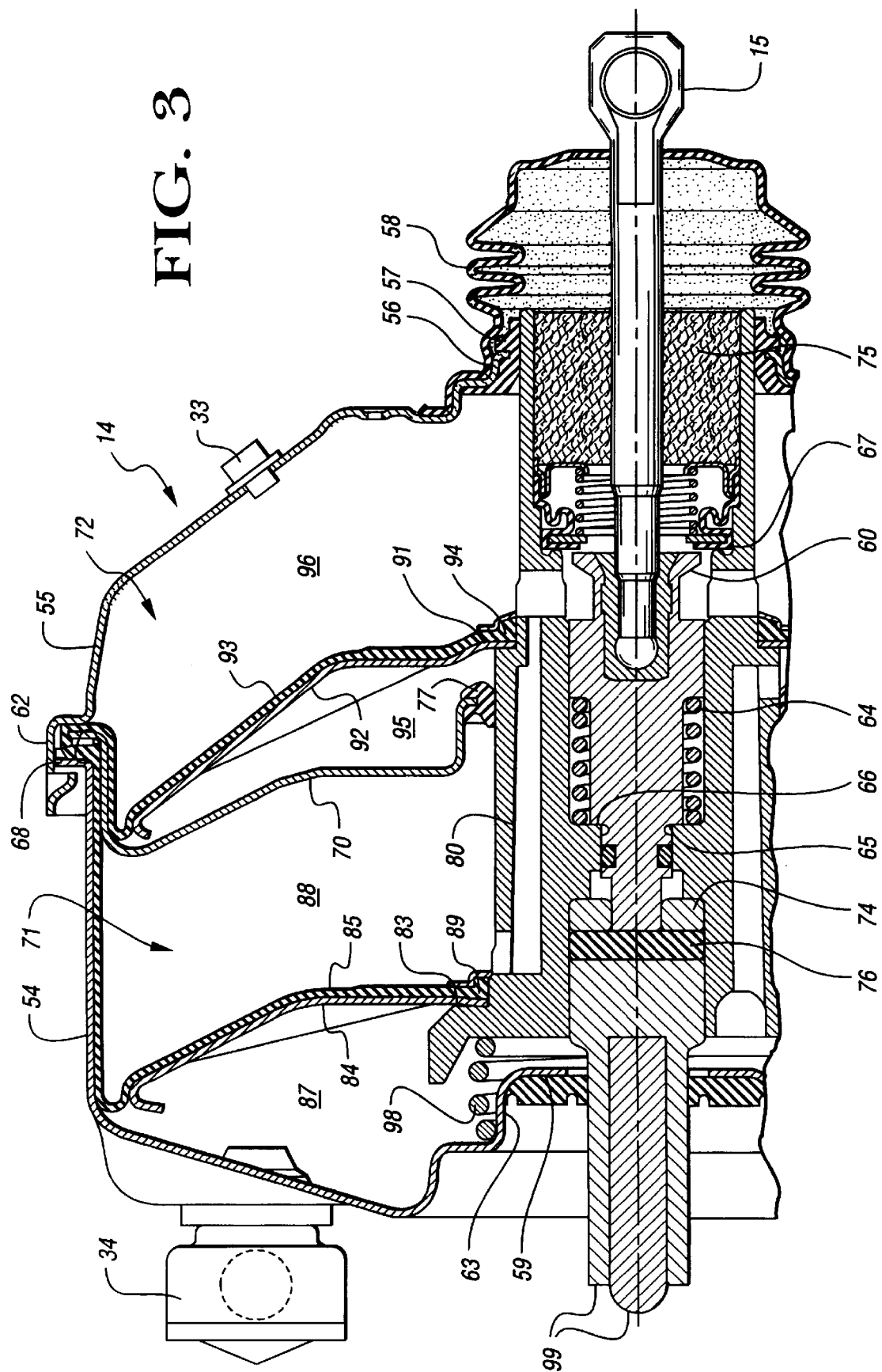

METHOD AND DEVICE FOR BRAKE APPLICATION

TECHNICAL FIELD

The present invention relates to a method and device for brake application and more particularly, to a method and device for brake application with the capability of maintaining a linear relationship between the operator induced brake pedal apply force and braking pressure beyond the run-out point of the booster.

BACKGROUND OF THE INVENTION

Brake apply systems are conventionally known wherein a brake pedal is connected through a push-rod to a power head operating on vacuum assist or hydraulic power. A manual application of force on the brake pedal is transferred through the push-rod to a power head which boosts/increases the amount of force transferred through the brake apply system under the operation of vacuum assist or hydraulic power. The power head applies an intensified force to a master cylinder assembly which draws fluid from an associating reservoir and applies fluid pressure to the braking system. Such a system is travel dependent meaning that braking pressure is a function of travel of the master cylinder and power head.

It is known that this type of conventional braking system can be adapted to operate in traditional base brake modes, anti-lock modes and traction control modes. With most conventionally known ABS systems, master cylinder pressure is used during a brake apply. The master cylinder pressure is transmitted through a modulator that limits the amount of pressure applied to the wheel brake during ABS operation. A motor driven pump is used to pump fluid from the wheel brake(s) to the master cylinder during an ABS release. During traction control operation, there may be no application of the brake pedal and therefore, the booster and master cylinder do not generate a force. Fluid pressure requirements are generated by the motor driven pump. The system's operation during base brake mode is controlled by the booster-assisted master cylinder.

Operation during ABS and traction control modes is generally effected by an ABS/TCS modulator. This modulator is electronically controlled in a programmed manner to limit or provide braking pressure when an event occurs according to preconceived parameters indicative of a preferred ABS or TCS intervention. The base brake mode of operation effects other conventional braking events when ABS and TCS operation is not required. The conventional master cylinder and vacuum booster must therefore, be designed to achieve all potentially necessary base brake operational requirements. This means that in-effect, two parallel, substantially independently operating brake apply mechanisms are provided for the single vehicle braking system.

So-called brake-by-wire systems are also known wherein brake pressure application is not directly generated by force on the brake pedal. These systems apply braking pressure by means of a pump or other pressure generation device in response to a sensed brake pedal application. In such systems it is difficult to make the pedal travel and feel characteristics transparent to the driver since a conventional booster is not employed or if employed, is isolated from the braking system. This can result in a non-preferred pedal feel during brake applications.

SUMMARY OF THE INVENTION

The present invention is concerned with a method and device for brake application wherein the base brake, ABS and TCS modes are more intimately associated than in previously known systems. The ABS/TCS modulator supplies supplemental hydraulic pressure for augmenting brake application in the base brake mode. According to an aspect of the present invention, a linear relationship is maintained, when preferred, between the operator brake pedal apply force and wheel brake pressure both prior-to and beyond the run-out point of the power booster. Run-out is the point at which the output force of the power booster is no longer a function of boost ratio but is solely a function of the input force on the brake pedal. The actual run-out point is dependent upon the design of the power booster and the associated brake system.

Providing supplemental hydraulic apply pressure in accordance with the present invention enables designing braking systems with smaller boosters than typically required to handle the normal base brake requirements of the system. This can result in advantageous cost savings and in smaller mass and packaging requirements for the overall braking system. Due to generally shrinking space availability in vehicular underhood environments, a reduced power booster size is preferable. At the same time, larger diameter master cylinder pistons may be preferable to provide better pedal feel and travel characteristics. Larger diameter master cylinder pistons displace more fluid for a given amount of pedal travel. However, larger diameter master cylinder pistons require increased input forces. Therefore, with a conventionally designed system, larger boosters would be required. Augmentation of the booster/master cylinder apply system with supplemental hydraulic apply pressure from the ABS/TCS modulator makes design options possible where booster size can be reduced and/or master cylinder piston size can be increased.

According to a preferred embodiment of the present invention, the vacuum booster and master cylinder preferably handle brake applies up to approximately 0.4 g's. This accounts for the vast majority of base brake apply events in a typical profile. Therefore, the inherently preferable pedal feel characteristics provided by a vacuum or hydraulic booster are preserved. Additionally, by designing the system to this criteria, the apply system size and cost is significantly reduced. Apply pressure augmentation via the ABS/TCS modulator preferably occurs for only a fraction of a percent of all brake applications. As a result pump and motor size is minimized due to limited duty cycles.

When the presence of a booster run-out condition or another triggering event is detected and additional braking is called for by actuation of the brake pedal, boost augmentation is automatically supplied by the ABS/TCS modulator. The power booster and master cylinder handle the majority of brake applies with modulator augmentation, generally being activated only at run-out conditions such as high decel requirements or low vacuum/ambient pressure differentials. The booster/master cylinder and the ABS/TCS modulator are individually capable of braking the vehicle to a stop. Additionally, in combination with the ABS/TCS system capabilities in place, the modulator augmented operation can be used to provide a specifically tailored braking performance. Rather than being travel dependent like a conventionally boosted system, the present system is a function of pressure.

A method of brake application for a system having a brake pedal, a power booster, a master cylinder, a pump and a valve according to a preferred aspect of the present invention includes applying the brake pedal to a point where the power booster reaches a run-out condition. At or near run-out the pump is started to generate an augmentation pressure. With the augmentation pressure available, a brake parameter sensor such as a pedal pressure sensor is continuously monitored to determine if brake pressure augmentation is required. When the brake parameter sensor indicates that augmentation is required, the augmentation pressure available, as generated by the pump, is delivered to the brake system for further brake application. This is preferably provided in a manner that maintains a linear relationship between the brake pedal apply initiated by the vehicle's operator and the wheel brake pressure, even after the run-out point of the power booster. The valve prevents the augmentation pressure from feeding back to the master cylinder while the master cylinder pressure is available for delivery to the wheel brakes if needed.

A device for brake application according to a preferred aspect of the present invention, wherein braking pressure is selectively augmented, such as before or after power booster run-out or independently of power booster operation, includes a power booster and master cylinder for generating a braking pressure in relation to the operator's input on the brake pedal. At least one brake parameter sensor is used to determine when the power booster reaches a run-out condition and at least one control valve in combination with a pump is used to apply braking pressure in response to additional increases in brake pedal application by the operator after the power booster reaches a run-out condition. The pump and control valve are optionally used to generate braking pressure in response to other triggering events, and/or independent of brake pedal inputs.

BRIEF DESCRIPTION OF THE DRAWINGS

FIG. 3 is a fragmentary cross sectional illustration of a power booster used in the brake system illustrated in FIG. 1.

DETAILED DESCRIPTION OF THE PRESENTLY PREFERRED EMBODIMENT

Figure 1:
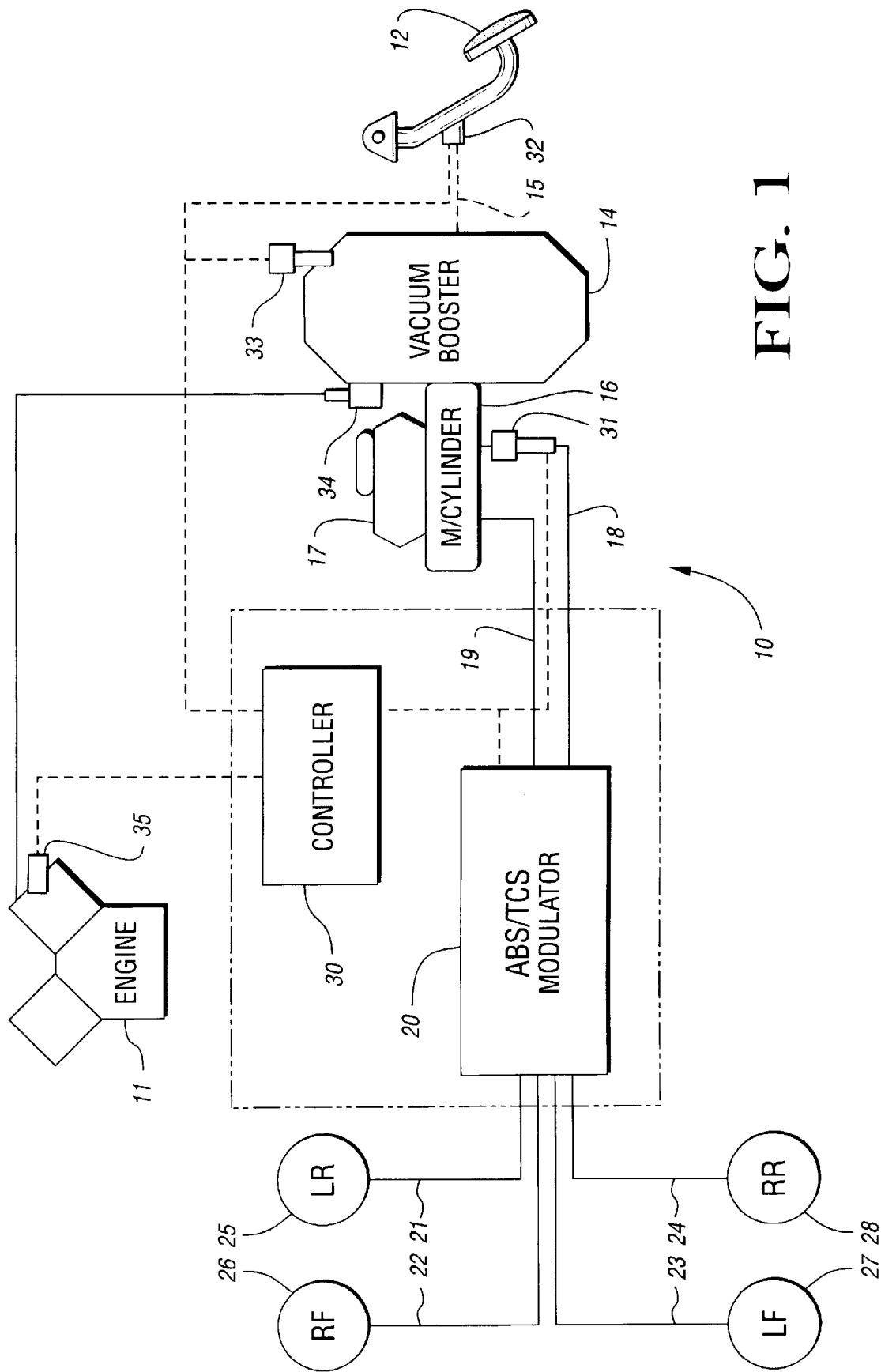
FIG. 1 is a schematic illustration of a brake system including a device for brake application.

Referring to the drawings, illustrated in FIG. 1 is a brake system including a device for brake application which operates according to the principle that the ABS/TCS modulator supplies supplemental hydraulic pressure upon the occurrence of preselected events to assist the power booster in applying the wheel brakes. Braking pressure augmentation is provided in response to, or independent of, the operator's input commands on the brake pedal. Although a diagonally split braking system is illustrated as an exemplary embodiment, the present invention is readily applicable to other types of brake systems such as a front/rear split system or a four channel system.

More specifically, FIG. 1 illustrates a brake system designated in the aggregate as 10 in combination with a vehicle engine 11. The brake system 10 includes a brake pedal 12 which provides input to the power booster 14 through the push-rod 15. The force applied to the push-rod 15 by the pedal 12 is intensified by the power booster 14 and is communicated to the master cylinder 16. The master cylinder 16 includes a fluid reservoir 17 for supplying the fluid needs of the brake system 10. The master cylinder 16 is of the conventional dual piston type wherein movement of the master cylinder pistons develops hydraulic pressure which is transmitted to a split braking system through brake lines 18 and 19. Brake lines 18 and 19 extend through the ABS/TCS modulator 20 and branch into brake lines 21–24 which connect with the four wheel brakes 25–28.

An electronic controller 30 is provided for managing operation of the brake system 10. The controller 30 communicates with the ABS/TCS modulator 20 and also with the engine sensor 35 and the braking parameter sensors 31–33. Sensor 31 is a pressure sensor for monitoring the fluid pressure in brake line 18 as generated by the master cylinder 16. Sensor 32 is a force sensor for monitoring the manually applied brake pedal force. Sensor 33 is a vacuum sensor for monitoring the vacuum/pressure level in the power booster 14. Sensor 35 is a manifold air pressure sensor for monitoring engine vacuum. Element 34 is a vacuum check valve with an optional vacuum sensor for monitoring the vacuum level in the power booster 14. The controller 30 is also provided with brake line pressure signals for the pressure at wheel brakes 25–28 through a conventional means. By monitoring and real time processing of the sensor signals, the controller 30 is capable of detecting a booster run-out condition, e.g. when the sensor 33 detects a pressure level reaching atmospheric.

Figure 2:
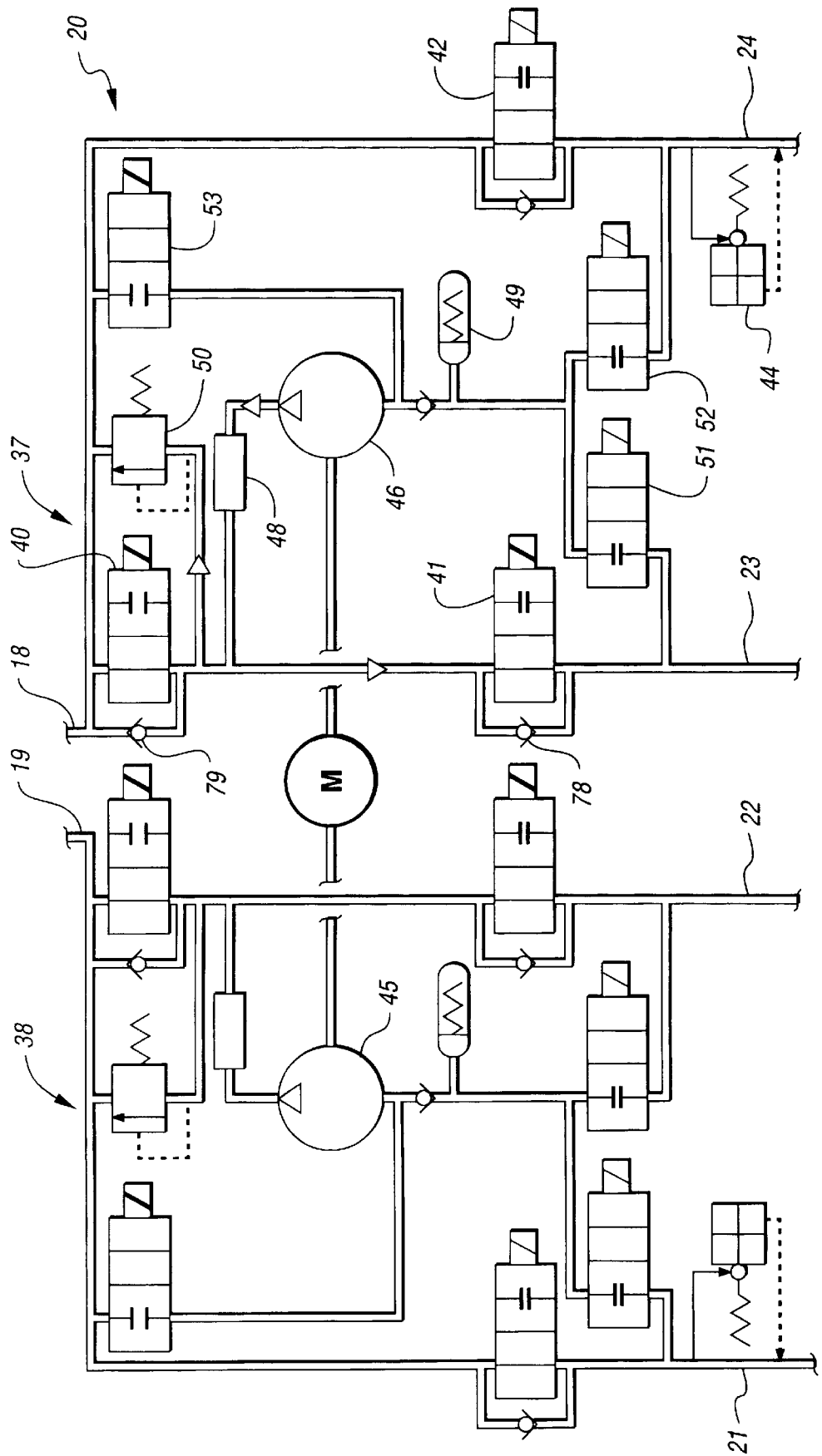
FIG. 2 is a detailed schematic illustration of the ABS/TCS modulator of the brake system of FIG. 1.

Referring to FIG. 2, details of the ABS/TCS modulator 20 are shown schematically in greater detail. Brake lines 18 and 19 each extend into the ABS/TCS modulator 20 providing a split braking system arrangement. In the present embodiment a diagonally split system is provided wherein the brake line 18 supplies left front wheel brake 27 and right rear wheel brake 28 through channel 37 and brake line 19 supplies right front wheel brake 26 and left rear wheel brake 25 through channel 38. For simplicity of description the details of channel 37 will be discussed with the understanding that the details of channel 38 are substantively the same and operate in the same manner.

Channel 37 supplies two wheel brakes through the brake lines 23 and 24 with a direct connection normally being provided between the master cylinder 16 and the wheel brakes 27 and 28 through the channel 37 when all valves are in their normal position as shown. In this normal position, the manual application of force to the brake pedal 12, shown in FIG. 1, actuates the master cylinder 16 through the push-rod 15 with power assist from the power booster 14 such that a braking pressure is generated in braking lines 18 and 19. This manually induced braking pressure is transmitted through channel 37 including isolation valve 40, apply valve 41 and apply valve 42. Brake line 24 includes an optional proportioner 44 for use in supplying braking pressure to rear wheel brake 28 in proportion to the pressure supplied to front wheel brake 27, when preferred. Through this normal base brake mode of operation, channel 37 enables the actuation of wheel brakes 27 and 28 directly in response to the manually actuated, power boosted, master cylinder 16. Channel 38 operates similarly for base brake modes.

Channel 37 also includes a motor driven pump 46 with a damper assembly 48 provided on the outlet side of the pump 46 to reduce the effects and noise pulsations created by the pump 46. A pressure relief valve 50 is also provided on the outlet side of pump 46 to permit the return of fluid to the reservoir 17 should the maximum design pressure on the outlet side of pump 46 be surpassed. The channel 37 also includes two release valves 51 and 52 for ABS and TCS operations.

During the base brake mode of operation of the brake system 10, if an incipient wheel lock condition occurs, as is determined by a conventional means such as an algorithm using wheel speed sensor input, the apply valves 41 and/or 42 are immediately energized to a closed condition and the pump 46 is brought into operation. In order to prevent the occurrence of the incipient wheel lock condition, the necessary release valve 51 or 52 is opened which permits an instantaneous pressure release through the brake line 23 or 24 to an accumulator 49 provided on the inlet side of the pump 46. Closure of the corresponding apply valve 41 or 42 ensures that the pressure available from the master cylinder 16 is not reapplied to the wheel brake until the incipient wheel lock condition is avoided. The pump 46 returns fluid to the master cylinder 16 through the brake line 18. The apply and release valves are modulated as necessary until the algorithm determines that ABS is not required. Also, the check valve 78 of apply valve 41 and the like check valve of apply valve 42, ensure that the wheel brake pressure is never greater than the master cylinder pressure during ABS operation.

During a traction control mode of operation of the braking system 10 when a threshold of wheel slip is surpassed, the isolation valve 40 is closed, the pump 46 is brought into operation and a prime valve 53 is opened to supply the pump 46 with fluid requirements from the reservoir 17 through the brake line 18. The apply valve 41 remains open, or is cycled open and closed to control apply rates, and the release valve 51 is closed so that fluid pressure is applied by the pump 46 through the brake line 23 to the driven front wheel brake 27 to limit the slip condition. The apply valve 41 is cycled to provide a selected amount of fluid pressure through the braking line 23 and if necessary, the release valve 51 is opened to reduce the pressure. As previously described, apply valve 41 includes the integral check 78. The isolation valve 40 includes an integral check 79 so that even if the isolation valve 40 is closed, the manually actuated master cylinder 16 induces fluid pressure flow to the wheel brakes, should a sufficient pressure differential occur between the wheel brakes 27 and/or 28 and the master cylinder pressure in brake line 18.

Referring to FIG. 3, the power booster 14 of FIG. 1 is shown in greater detail. Power booster 14 is a dual diaphragm vacuum operated booster in this exemplary embodiment. However, the present invention is also applicable to systems with a single diaphragm vacuum booster and to hydraulic or pneumatic operated boosters. FIG. 3 illustrates in cross section essentially half the power booster 14 with the remaining unillustrated portion being substantially a mirror image for purposes of the present discussion. Power booster 14 has a substantially open internal cavity which is formed by mating front housing 54 and rear housing 55. The front and rear housings 54 and 55 are formed from a conventional material such as metal or plastic. Rear housing 55 includes an axially extending flange 62. Axially extending flange 62 mates with outer turned flange 68 of front housing 54 locking the housings 54, 55 together. An inner edge 56 of rear housing 55 carries a seal 57. The end of rear housing 55 is enclosed by boot 58 which is received over the inner edge 56. Another seal 59 seals the area at inner edge 63 of front housing 54. The seal 59 is secured between the rearward end of master cylinder 16, (seen in FIG. 1), and the front housing 54.

A housing divider 70 separates the internal cavity into front and rear chambers 71 and 72, respectively. Housing divider 70 includes an outer peripheral flange which is engaged between the front housing 54 and rear housing 55. Housing divider 70 also includes an inner edge which carries an annular seal 77. A power piston 80 extends through annular seals 57 and 77. The power piston 80 is slidable forwardly and rearwardly within the annular seals 57 and 77. The annual seals 57 and 77 act as bearings for supporting the power piston 80 in the lateral direction.

Power piston 80 includes a rearwardly directed wall 83 against which support plate 84 supports diaphragm 85. Diaphragm 85 includes an integral inner annular seal 89 which engages the power piston 80. Diaphragm 85 separates chamber 71 into control volume 87 and control volume 88. Power piston 80 also includes rearwardly directed wall 91 against which support plate 92 supports diaphragm 93. Diaphragm 93 includes an integral inner annular seal 94 which engages the power piston 80. Diaphragm 93 separates rear chamber 72 into control volume 95 and control volume 96.

The diaphragms 85 and 93, and their respective support plates 84 and 92, are operable such that a vacuum pressure exists in control volumes 87 and 95 which is generated therein through vacuum check valve 35 by the engine 11. A variable pressure exists in control volumes 88 and 96 for selectively moving power piston 80 forward in response to pressure differentials created by the introduction of atmospheric air through air valve 60. The variable pressure in control volumes 88 and 96 selectively creates a force on the respective diaphragms 85 and 93. The support plates 84 and 92 apply the force of the diaphragms to the respective rearwardly directed walls 83 and 91 of power piston 80. In response, power piston 80 compresses return spring 98 as shown, causing power piston 80 to slide within annular seals 77 and 78 forcing rod 99 to apply force to the master cylinder 16.

The variable pressure in control volumes 88 and 96 is increased through operation of the air valve 60. Air valve 60 is illustrated in the open position which allows atmospheric pressure to enter the control volumes 88 and 96 and thus creates a pressure differential across the diaphragms 85 and 93. The maximum pressure differential between control volumes 87 and 95 on one hand and control volumes 88 and 96 on the other hand, is the difference between engine vacuum and atmospheric.

Atmospheric air entering the power booster 14 travels through filter 75 and the vacuum drawn from the power booster 14 exits through vacuum check valve 34 which is received in the front housing 54. Power piston 80 includes a plurality of air passages through which flow is directed in a conventional manner. The power booster 14 is shown in a run-out condition meaning that the air valve 60 is fully opened compressing spring 64 with shoulder 65 against stop 66. The power piston 80 is moved to the left as viewed in FIG. 3 to the run-out position such that spring 98 is compressed and no additional power boost increase is possible.

When the pressure in control volumes 88 and 96 reaches atmospheric no further additional pressure differential increase is possible. Accordingly, the power booster 14 is no longer able to further amplify the driver force input on the pedal 12. Additional force on the pedal 12 still translates into increased pressure at the wheel brakes 25–28, however, the additional pressure is solely a function of the input force on the pedal 12 rather than being a function of the boost ratio of the power booster 14. The power piston 80 transmits power assisted force through the elements 74 and 76 to the rod 99 and therethrough to the master cylinder 16. At the run-out condition further travel of the power piston 80 is possible. Therefore, the presence of increased force applied through the brake pedal 12 to the push-rod 15 results in additional application of force through the elements 74 and 76, and therethrough to the rod 99.

After brake application, when the push-rod 15 is released, spring 64 forces air valve 60 to close with floating control valve 67 interrupting the flow of atmospheric air into the power booster 14. Vacuum flow out through the vacuum check valve 34 reequalizes pressure on opposing sides of diaphragms 85 and 93. As the pressure differential is reduced, return spring 98 forces power piston 80 to slide rearwardly and return to an at-rest position.

Referring to FIGS. 1 and 2 in combination, when the power booster 14 is in the run-out condition, or when vehicle braking independent of manual input through the pedal 12 is preferred, the ABS/TCS modulator 20 operates to assist or control braking application. When in the run-out condition, the power booster 14 is no longer able to further amplify the driver force input on the pedal 12. At this point the brake system 10 uses the ABS/TCS modulator to augment the brake pressure applied to the wheel brakes 25–28.

The controller 30 detects the presence of a run-out condition through the processing of signals from the sensors 31–34, as required. For example, when the sensor 33 indicates that the pressure in control volume 96 reaches atmospheric, run-out is detected. Optionally, a vacuum sensor is associated with the vacuum check valve 34 in the front housing 54 to detect booster run-out. The controller 30 determines through input from the sensor 32 whether driver effort and the desired braking performance is still increasing. In response to additional increases in force, the motor driven pumps 45 and 46 are brought into operation generating augmentation pressure which is selectively applied to the front wheel brakes 26 and 27 through the brake lines 22 and 23.

In combination, the operation of the pumps 45 and 46 is initiated and the prime valve 53 of channel 37 and the associated prime valve of channel 38 are open to supply fluid to the pumps 45 and 46. Additionally, the isolation valve 40 of channel 37 and the corresponding isolation valve of channel 38 are closed. Through use of the ABS/TCS modulator 20, braking pressure is increased and a linear relationship is maintained between the application of force to the brake pedal 12 and vehicle deceleration beyond the run-out point of the power booster 14. The apply valves, such as apply valve 41, are modulated open and closed to selectively increase brake pressure at the wheel brakes. If the pressure generated by master cylinder 16 is greater than the augmentation pressure generated by the pump 46, the check valve 79 permits the application of the master cylinder pressure to the wheel brakes.

Operation of the brake system 10 to maintain a linear relationship between the force on the brake pedal 12 and the wheel brake pressure prior to run-out is available when needed or preferred. Additionally, the ABS/TCS modulator 20 is operable independently of the master cylinder 16 to supply braking pressure when desired. When the brake system 10 operates to maintain a linear relationship between the force on the brake pedal 12 and the wheel brake pressure, three distinct performance segments occur. When the brake pedal 12 is initially applied, the power booster intensified master cylinder 16 generates a master cylinder pressure in brake lines 18 and 19 that is essentially the same as the pressure applied to the wheel brakes 25–28, neglecting any front to rear proportioning. When the controller 30 determines that run-out of the booster 14 has occurred, the ABS/TCS modulator 20 operates to maintain a relationship between any additional force applied to the brake pedal 12 and the wheel brake pressure. During this segment, the wheel brake pressure is greater than the master cylinder pressure. When the brake pedal 12 is released, the wheel brake pressure is reduced by the ABS/TCS modulator 20 and, when the brake pedal 12 is sufficiently released, wheel brake pressure re-equalizes with the master cylinder pressure.

Through means of the foregoing, a brake system according to the present invention provides augmentation of the boost supplied by the apply system's booster. This may be preferable when a vacuum booster is used and is operated beyond its run-out point. It may also be preferable to augment boost prior to run-out, with other types of boosters, or when braking parameters such as hard brake applies occur.

What is claimed is:

1. A device for a brake application comprising:

a master cylinder;

a power booster engaging the master cylinder;

a brake pedal for operatively interacting with the power booster through a push-rod;

a sensor operative to generate a power booster run-out indicative signal;

a fluid braking circuit connected to the master cylinder;

a wheel brake connected to the fluid braking circuit;

a pump in the fluid braking circuit;

means responsive to generation of the power booster run-out indicative signal by the sensor and the application of further force to the brake pedal for operating the pump so as to generate an augmentation pressure and apply the augmentation pressure to the wheel brake; and an isolation valve, including a check valve, positioned in the fluid braking circuit between the master cylinder and the wheel brake wherein the isolation valve is closed when the sensor generates the booster run-out indicative signal.

2. A device according to claim 1 further comprising a prime valve positioned in the braking circuit between the master cylinder and the pump wherein when the sensor generates the run-out indicative signal the prime valve is opened to provide a fluid supply from the master cylinder to the pump.

3. A device according to claim 2 further comprising a pressure relief valve positioned in the fluid braking circuit between the pump and the master cylinder wherein when the augmentation pressure surpasses a preselected limit, fluid flows through the pressure relief valve from the pump to the master cylinder.

* * * * *